US006070870A

United States Patent [19]

Gramlich et al.

[11] Patent Number: 6,070,870

[45] Date of Patent: Jun. 6, 2000

[54] INTEGRAL DRIVE ROLL BEARING ASSEMBLY

[75] Inventors: John D. Gramlich, Webster; Kathleen M. Martin, Hamlin, both of N.Y.

[73] Assignee: Xerox Corporation, Stamford, Conn.

[21] Appl. No.: 08/838,629

[22] Filed: Apr. 11, 1997

[51] Int. Cl.[7] .......................... B65H 29/20; F16C 43/04; F16C 33/02

[52] U.S. Cl. .......................... 271/314; 271/198; 384/295; 384/296

[58] Field of Search .................................... 271/314, 198; 384/295, 296

[56] References Cited

U.S. PATENT DOCUMENTS

| | | | |
|---|---|---|---|
| 3,455,613 | 7/1969 | McGrath | 384/295 |
| 5,013,166 | 5/1991 | Domer | 384/295 |

FOREIGN PATENT DOCUMENTS

| | | |
|---|---|---|
| 58-125538 | 7/1983 | Japan . |
| 04159941 | 6/1992 | Japan . |
| 05080595 | 4/1993 | Japan . |
| 05338827 | 12/1993 | Japan . |
| 07187437 | 7/1995 | Japan . |
| 07228367 | 8/1995 | Japan . |
| 07232838 | 9/1995 | Japan . |

*Primary Examiner*—Donald P. Walsh
*Assistant Examiner*—Brett C. Martin
*Attorney, Agent, or Firm*—Kevin R. Kepner

[57] ABSTRACT

A replacement drive roll having an integral bearing for easy replacement and universal usage in a printing machine. The roll member has a bearing having a nonround outer race for retention in a frame member and a nonround inner race for engagement with a driveshaft on one end. The opposite end has a locking member for preventing axial movement along the shaft. The roll assembly has elastomer bands stretched around the outer circumference to form the drive surface of the roll. The roll unit is easily replaced and can be used in numerous locations thereby reducing parts inventory requirements.

8 Claims, 4 Drawing Sheets

INTEGRAL DRIVE ROLL BEARING ASSEMBLY

This invention relates generally to a cut sheet feeder, and more particularly concerns a replaceable drive roll assembly for use in feeding cut sheets in an electrophotographic printing machine.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet. After each transfer process, the toner remaining on the photoconductor is cleaned by a cleaning device.

In printing machines such as those described above, drive roll assemblies are used throughout a machine in document handlers, special material handlers, paper paths and in paper supply trays. As currently configured, the feed rollers, when worn, must be replaced by a service technician and usually requires disassembly of the drive assembly and replacement of an entire roll/shaft assembly in the drive assembly and necessary adjustments thereof. It is desirable to have a machine in which the drive rolls are easily replaceable by a technician. This easy replacement allows the service technician to quickly and easily replace the drive roll components when worn without excessive down time.

It is also desirous to have a drive roll replacement component that is low in cost, very compact and somewhat universal so as to be able to be used in different locations throughout the printing machine. It is further desirable to have a drive roll replacement component which does not require extensive adjustment and/or disassembly of the printing machine for replacement.

In accordance with one aspect of the present invention, there is provided an integral drive roll and bearing assembly, comprising a cylindrical roll, a retaining member, located at a first end of said cylindrical roll, for locating said drive roll axially along a shaft and a bearing attached to the end of said cylindrical roll opposite said retaining member, wherein said bearing extends beyond said roll to provide a mount support.

Pursuant to another aspect of the present invention, there is provided an electrophotographic printing machine having an integral drive roll and bearing assembly, comprising a cylindrical roll, a retaining member, located at a first end of said cylindrical roll, for locating said drive roll axially along a shaft and a bearing attached to the end of said cylindrical roll opposite said retaining member, wherein said bearing extends beyond said roll to provide a mount support.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
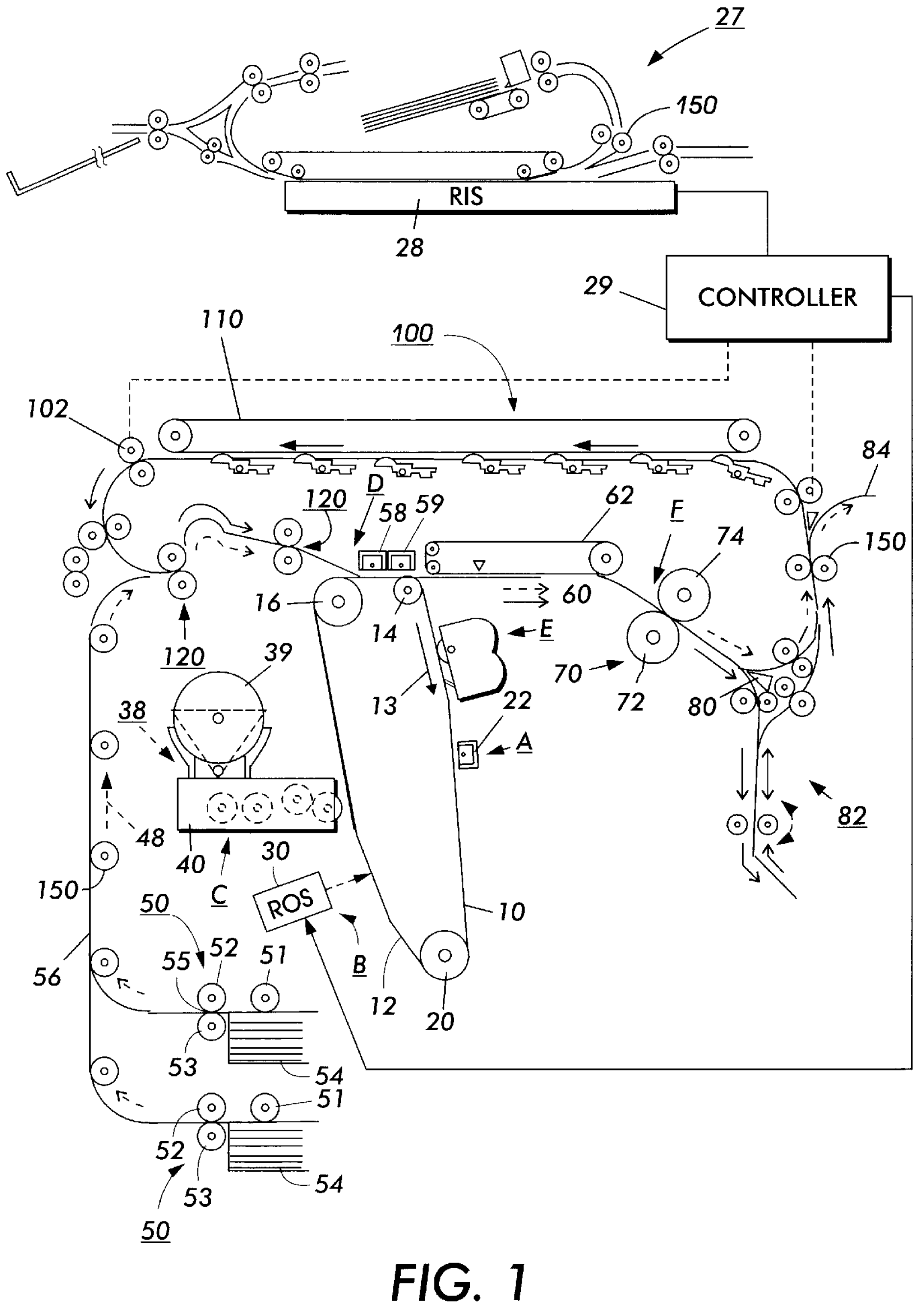
FIG. 1 is a schematic elevational view of a typical electrophotographic printing machine utilizing the integral drive roll and bearing assembly therein.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the integral drive roll and bearing assembly of the present invention may be employed in a wide variety of devices and is not specifically limited in its application to the particular embodiment depicted herein.

Referring to FIG. 1 of the drawings, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) 30 described below.

FIG. 1 schematically illustrates an electrophotographic printing machine which generally employs a photoconductive belt 10. Preferably, the photoconductive belt 10 is made from a photoconductive material coated on a ground layer, which, in turn, is coated on an anti-curl backing layer. Belt 10 moves in the direction of arrow 13 to advance successive portions sequentially through the various processing stations disposed about the path of movement thereof. Belt 10 is entrained about stripping roller 14, tensioning roller 16 and drive roller 20. As roller 16 rotates, it advances belt 10 in the direction of arrow 13.

Initially, a portion of the photoconductive surface passes through charging station A. At charging station A a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or greyscale rendition of the image which is transmitted to a modulated output generator, for example the raster output scanner (ROS), indicated generally by reference numeral 30. Preferably, ESS 29 is a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. Preferably, a nine facet polygon is used. The ROS illuminates the charged portion of photoconductive belt 10 at a resolution of about 300 or more pixels per inch. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 1, after the electrostatic latent image is developed, the toner powder image present on belt 10 advances to transfer station D. A print sheet 48 is advanced to the transfer station, D, by a sheet feeding apparatus, 50. Preferably, sheet feeding apparatus 50 includes a feed roll 52 contacting the uppermost sheet of stack 54. Feed roll 52 rotates to advance the uppermost sheet from stack 54 into vertical transport 56. Vertical transport 56 directs the advancing sheet 48 of support material into registration transport 57 past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. Preferably, fuser assembly 70 includes a heated fuser roller 72 and a pressure roller 74 with the powder image on the copy sheet contacting fuser roller 72.

The sheet then passes through fuser 70 where the image is permanently fixed or fused to the sheet. After passing through fuser 70, a gate 80 either allows the sheet to move directly via output 16 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84. The sheet is driven throughout the machine by various drive rolls 150 which are described in greater detail below.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

It is believed that the foregoing description is sufficient for purposes of the present application to illustrate the general operation of an electrophotographic printing machine incorporating the features of the present invention therein.

Figure 2:
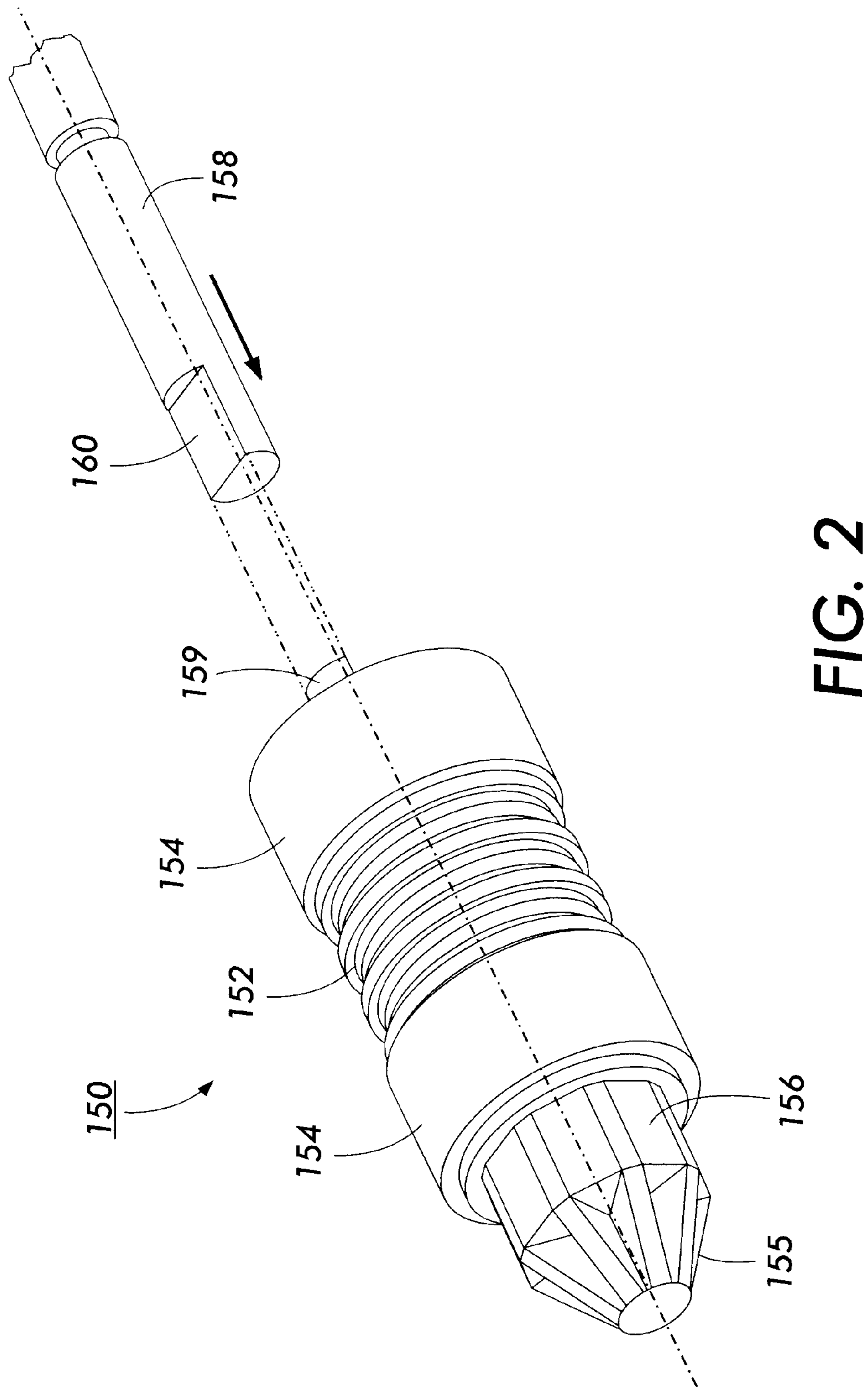
FIG. 2 is a perspective view of the drive roll bearing assembly.
Figure 3:
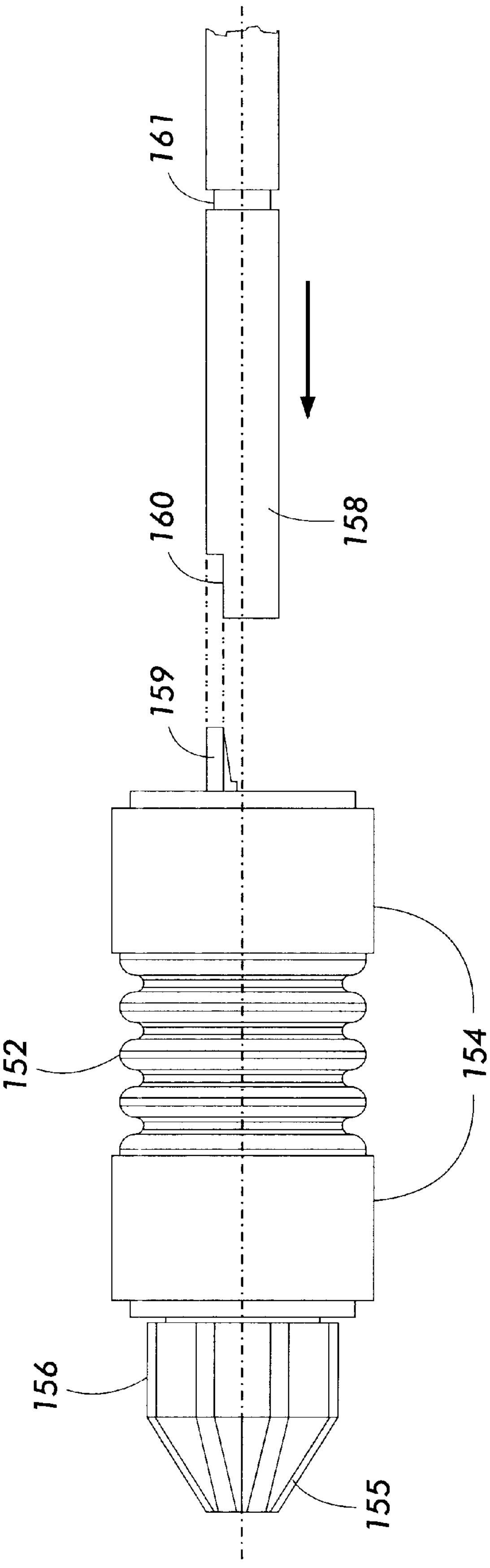
FIG. 3 is a side view of the drive roll bearing assembly.

Turning now to FIGS. 2 and 3 the components of the replaceable integral drive member and bearing are illustrated. The drive member consists of the main roll member 152 which has a bearing member 156 on one end and a shaft locking member 159 on the opposite end. There are a pair of elastomer bands 154 stretched over the roll member 152. A shaft 158 is inserted in the end of the drive roll 150 having the locking member 159. The locking member 159 cooperates with a groove 161 in shaft 158. A D-shaped section 160 on the shaft locks into the non round inner race of bearing 156. The bearing 156 also has a non round outer race to prevent rotation when inserted in an aperture in a machine frame or sidewall.

Figure 4:
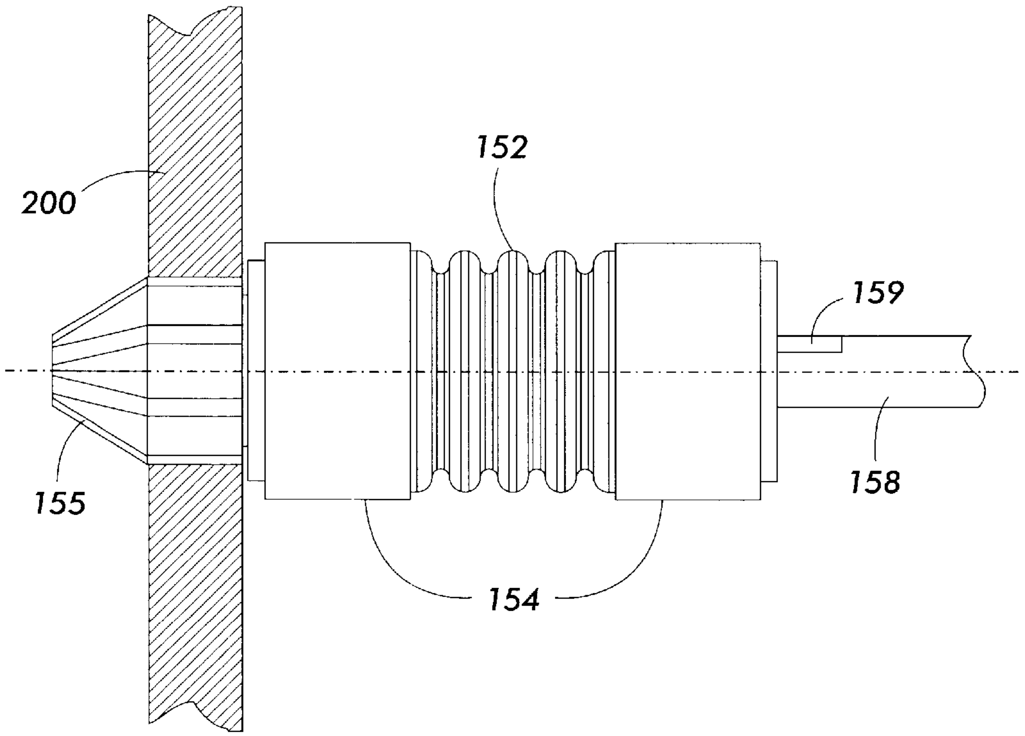
FIG. 4 is a side elevational view of the drive roll bearing assembly as located in a machine frame or sidewall.

Turning now to FIG. 4 there is illustrated a assembled drive roll in a machine wall or frame member 200 the tapered section 155 of the bearing 156 helps to guide the wall section 200 over the bearing end. In the event of a drive roll failure or wearing out, the wall member 200 can be easily removed and the drive roll member 150 unlocked by lifting on locking member 159 to remove the roll from the shaft 158. The entire roll assembly 150 can then be replaced and the wall member 200 reattached.

Figure 5:
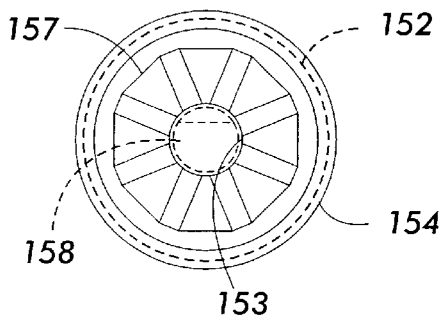
FIG. 5 is an end view of the drive roll bearing assembly.

FIG. 5 illustrates the locking portions of the inner and outer bearing race with the non round profile 153 of the inner race shown with shaft 158 inserted and the non round outer race 157 also illustrated.

The assembly as shown may be used in various locations throughout an electrophotographic printing machine or any other type printing machine in which individual cut sheets are fed. Due to this versatility, the same drive roll design can be located in several locations, thereby reducing the spare part inventory required for a particular machine or machines. The simplicity of the device further allows for easy replacement by a service technician.

In recapitulation, there is provided a replacement drive roll having an integral bearing for easy replacement and universal usage in a printing machine. The roll member has a bearing having a nonround outer race for retention in a frame member and a nonround inner race for engagement with a driveshaft on one end. The opposite end has a locking member for preventing axial movement along the shaft. The roll assembly has elastomer bands stretched around the outer circumference to form the drive surface of the roll. The roll unit is easily replaced and can be used in numerous locations thereby reducing parts inventory requirements.

It is, therefore, apparent that there has been provided in accordance with the present invention, a replaceable drive roll assembly that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An integral drive roll and bearing assembly, comprising;

a cylindrical roll;

a retaining member, located at a first end of said cylindrical roll, for locating said drive roll axially along a shaft and securing said cylindrical roll to the shaft to allow rotational motion to be imparted to said cylindrical roll;

a bearing attached to the end of said cylindrical roll opposite said retaining member, wherein said bearing extends beyond said cylindrical roll to provide a mount support and said bearing is a axially in a fixed positional to said cylindrical roll.

2. An integral device according to claim 1, wherein said bearing comprises non-round outer race for securing an end of said cylindrical drive roll.

3. An integral device according to claim 1 wherein said bearing comprises an inner race having a non-round aperture for rotational engagement with the shaft.

4. An integral device according to claim 1 wherein said bearing has a tapered portion extending beyond said roll for guiding the assembly into a mounting aperture.

5. An electrophotographic printing machine having a sheet drive member for feeding cut sheets along a path, comprising:

a cylindrical roll;

a retaining member, located at a first end of said cylindrical roll, for locating said drive roll axially along a shaft and securing said cylindrical roll to the shaft to allow rotational motion to be imparted to said cylindrical roll;

a bearing attached to the end of said cylindrical roll opposite said retaining member, wherein said bearing extends beyond said cylindrical roll to provide a mount support and said bearing is axially in a fixed positional relationship to said cylindrical roll.

6. A printing machine according to claim 5, wherein said bearing comprises non-round outer race for securing an end of said cylindrical drive roll.

7. A printing machine according to claim 5 wherein said bearing comprises an inner race having a non-round aperture for rotational engagement with the shaft.

8. A printing machine according to claim 5 wherein said bearing has a tapered portion extending beyond said roll for guiding the assembly into a mounting aperture.

* * * * *